Feb. 27, 1968   H. DAVIES   3,370,430

ROCKET MOTOR

Filed Oct. 23, 1964

INVENTOR.
HAROLD DAVIES
BY Thomas W. Brennan

United States Patent Office 3,370,430
Patented Feb. 27, 1968

3,370,430
ROCKET MOTOR
Harold Davies, Morris Plains, N.J., assignor to Thiokol Chemical Corporation, Bristol, Pa., a corporation of Delaware
Filed Oct. 23, 1964, Ser. No. 406,040
5 Claims. (Cl. 60—251)

The present invention relates to rocket motors of the liquid propellant type and more particularly, to prepackaged liquid propellant rocket motors having high performing capabilities.

In prepackaged liquid propellant rocket motors, the liquid propellants are sealed in integrated propellant tankage for indefinite periods as one of the chief advantages thereof. Such motors include, in addition to the tankage, an integrated combustion chamber to which the propellants are admitted through a valve or injection means at the appropriate time and a means for pressurizing the propellants in the tanks.

The pressurizing means is usually a solid propellant grain which produces large quantities of gas upon initiation of combustion thereof. Upon initiation of combustion of the pressurizing grain, the gas which is produced enters, or is otherwise directed to the tanks to create pressure therein. Commonly, the solid propellant pressurizing grain is also used for operating the valve or injection means and to aid in ignition and mixing of the propellants when admitted to the combustion chamber.

Such prepackaged liquid propellant motors, in addition to their advantage of long term storage, while possessing higher performing characteristics than their solid propellant counterparts, are still not capable of performing as well as ordinary liquid bipropellant motors. It has been found during testing of these prepackaged liquid powerplants that significant improvement in their performance can be expected if certain solid combustible particles, for instance, powdered or particulated metal and the like, are added to and burned with the propellants. However, it has also been found to be rather impractical until now, to supply these additive materials, because of their solid nature, at uniform and/or reproducible rates. It is not practical, also, to dissolve them in one or both of the liquid propellants because of their insolubility and/or reactivity. For instance, most liquid oxidizers used today are chemically very active, hence, any attempt to add these materials directly thereto results in, at best, a potentially dangerous mixture. Where the particles are dissolvable, it is still impractical, if not impossible, to store the motor when loaded with propellant for any length of time since the additive materials tend to settle out during storage and it becomes necessary to periodically agitate the mixture to re-establish it. Thus, the fuel and oxidizer, upon entering the combustion chamber, together with the particles transported therein, tend to flow unevenly, disadvantageously affecting the ratio of flow of oxidizer to fuel ($O/F$ ratio) into the combustion chamber. As a result, erratic or unstable burning is induced in the motor, an undesirable occurrence. In addition, uneven distribution of the particles causes clogging of the valve or injection means and the combustion chamber cooling passages resulting in motor burnout and/or premature cessation of operation. These and other problems have been overcome by the hereinafter to be described invention by the inclusion in a prepackaged liquid propellant powerplant of an additional low temperature burning grain which is fabricated with combustible, particulated or powdered material dispersed therethrough. By this means, it becomes quite practical to control and maintain the particles evenly dispersed, and correspondingly thereto, permitting a predetermined, controlled rate of entry thereof into the combustion chamber upon initiation of ignition of the grain. It is generally desirable to include the additional grain rather than incorporate the particles in the propellant tank pressurizing grain since these particles behave like fuels and tend to react with the propellants, especially the oxidizer.

As will hereinafter become apparent, this disadvantage of prior art motors has been obviated by this invention which has for its most important object to provide a motor of the character described wherein particulated, combustible material is supplied to the motor combustion chamber to improve significantly the motor performance.

An additional object of the invention is to provide a motor of the character described wherein energy augmenting material is transported to the combustion chamber thereof in a safe and controlled manner and at a uniform rate.

Another object of this invention is to provide a prepackaged liquid propellant rocket motor of the type wherein propellants are injected into a combustion chamber under pressure supplied by the products of combustion of a solid propellant grain, and wherein an additional solid propellant grain is included having dispersed therein, solid, energy augmenting combustible material which is transporated to the chamber by gases produced upon combusting said additional grain.

Still another object of this invention is to provide a rocket motor of the type disclosed wherein the particles are metallic in nature and the grain containing them is selected for its low temperature burning qualities.

A further object is to provide a motor of the type described wherein the additional grain in addition to its gaseous products of combustion acting as a transporting means for particulated, combustible material to the combustion chamber, also provides, at least in part, ignition of the liquid propellants and the particulated material comingled therewith.

These and other objects and advantages will become more apparent to a skilled artisan using the invention from the following description and drawing in which.

Figure 1:
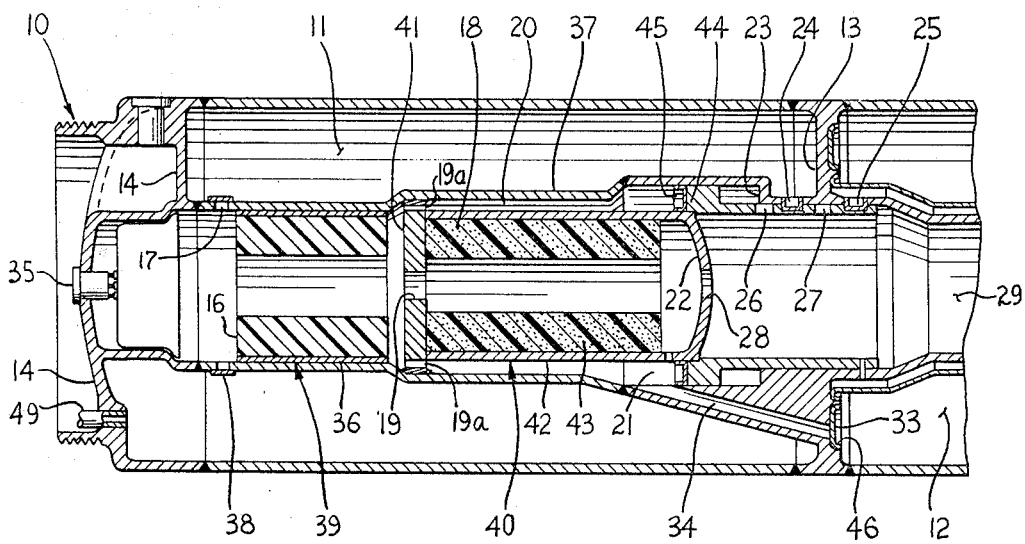
FIGURE 1 is a longitudinal, sectional view of a powerplant of the invention showing its separate parts.

Referring to the drawing, and in particular to FIG. 1, there is shown a prepackaged liquid powerplant 10 including a propellant (oxidizer) tank 11, and a fuel tank 12. Powerplant or motor 10 with tanks 11 and 12, is of elongated form, preferably fabricated from a lightweight, high-strength aluminum casting or extrusion and comprises a central header 13 for sealingly separating tanks 11 and 12, a forward or head end plate or cover 14, comprising an igniter 35 centrally disposed therein, and a filling port 49, and an aft end header or ring closure 15. Centrally disposed in the forward end of motor 10 is a solid propellant pressurizing grain 16 contained in a casing 36 which together comprise a gas generator 39. Grain 16 is preferably selected to have characteristics for producing relatively inert gas compatible with oxidizers of reactive character. In general, most composite and double-base type propellants can be formulated so as to serve this purpose.

Oxidizer tank 11 also comprises an inner, annular wall 37 of a diameter slightly larger than that of casing 36 and is fitted with circumferentially disposed gas flow orifices 17 in the forward end thereof. A burst band 38 covers orifices 17 for a purpose to be later described. Adjacent gas generator 39 is a second gas generator 40 separated by an orifice 19 in a partition or separator 41. Gas generator 40 comprises a casing 42 fixedly attached to partition 41 and contains a second solid propellant grain 18. Grain 18 is sized and selected for a purpose to be later indicated, of a relatively low temperature burning composition, i.e., fuel rich organic binder containing composite propellant and has uniformly dispersed therethrough particulated or powdered, combustible energy-giving material 43. These particles are preferably metallic in nature selected from the group aluminum, beryllium, lithium, titanium, magnesium and the like. Other essentially nonmetallic or mettaloid substances are also useful and include boron, silicon, and certain organoboron compounds such as decarborane and the like.

Propellant grain 18 is preferably bonded to separator plate 41 and annular wall 37 is outwardly or radially recessed to provide an annular gas passageway 20 surrounding generator 40 casing 42. Access to passageway 20 is provided by holes 19a in plate 41. Passageway 20 ends in an annular antechamber 21 surrounding the aft end of generator 40 and its aft end plate 22, which is formed by an additional, radially extending recess in wall 37 and an annular slide valve member 44. A seal 45 abuts valve member 44 at its outer, forward edge.

Valve member 44 is slidably positioned in central header 13 and contains a pair of rows of orifices 26 and 27, as will be hereinafter described, and is capable of sliding under pressure until its forward end abuts shoulder 23 in wall 37 whereupon orifices 26 and 27 come into register with corresponding rows of orifices 24 and 25 in wall 37 adjacent central header 13 on either side thereof.

Annular chamber 21 also has a fluid passage 34 for gas pressure communication with rupturable burst band 33 contained in header 13. Band 33 covers fuel tank orifice 46.

Figure 2:
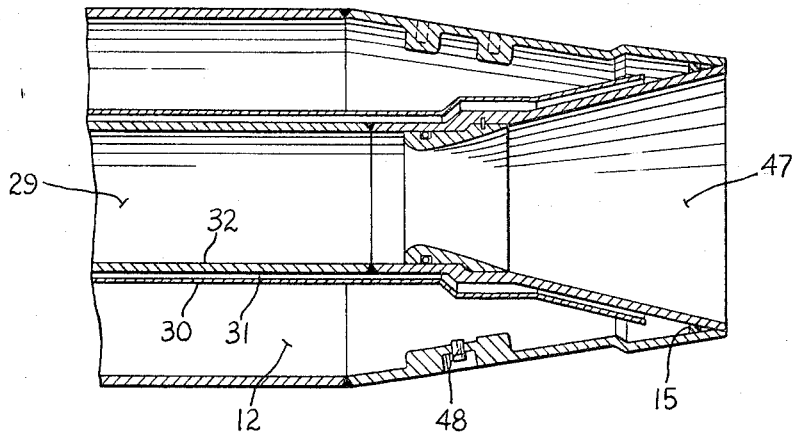
FIGURE 2 is a sectional view of the combustion chamber portion of the invention set forth in FIG. 1.

In FIG. 2, there is shown the aft end of motor 10 comprising a combustion chamber 29 (also FIG. 1) an exit cone or nozzle 47, fuel tank 12, chamber shell 32, baffle 30, coolant passage 31 therebetween and fuel tank filling port 48.

In operation of the invention tanks 12 and 11 are filled with fuel and oxidizer respectively by means of fill ports 49 and 48 and hermetically sealed. Igniter means 35 is fired by electrical means (not shown) and ignites grain 16 in gas generator 39 producing pressurizing gas. Upon ignition of grain 16, gas is produced which flows in both directions, i.e., into the head end where rupturable band 38 is burst, permitting gas to gain entrance to oxidizer tank 11 through orifice 17, pressurizing it. Simultaneously gas enters secondary grain 18 central perforation through orifice 19 in plate 41 and ignites it, and passes around secondary gas generator 40 by means of annular passageway 20 through holes 19a, and into antechamber 21 to apply a force against valve member 44 causing it to slide toward motor 10 aft end until it abuts shoulder 23. Upon abutting shoulder 23, orifices 26 and 27 come into register with central header orifices 24 and 25. Gas also flows into passage 34 and ruptures fuel tank burst band 33 thereafter entering tank 12 through orifices 46, pressurizing the fuel therein. Fuel is thereby caused to flow under pressure into coolant passage 31 to aid in cooling shell 32 and into chamber 29 through fuel orifices 25 and 27. Seal 45 prevents leakage of gas around the outer surfaces of valve member 45. Oxidizer also flows under pressure through oxidizer orifices 24 and 26 into chamber 29. Oxidizer and fuel are then ignited in chamber 29 by gas emanating from secondary grain 18 (and the small amount of grain 16 gas) which enters chamber 29 through orifice 28 in plate 22 in jet-like form to aid in mixing the liquid propellants from tanks 11 and 12. Since grain 18 contains particulated material 43, upon combustion, material 43 is transported by the combustion gases produced thereby into chamber 29 and combusted with the propellants from tanks 11 and 12. Grain 18 propellant is selected to insure that its combustion temperature is lower than the melting point of the powdered material 43 dispersed therein, insuring against melting or vaporizing thereof until after arrival in chamber 29. Thus, particulated material 43 remains solid, although preheated, and is effectively "metered" into chamber 29. In this manner there is presented to the art a device and a method or process for safely and economically operating a rocket motor with state of the art propellants to achieve higher performance than heretofore possible while simultaneously achieving significant gains in overall motor performance.

Having described the invention, it is understood that its form, as shown and described herein, is a preferred embodiment, and that various changes in the shape, size and arrangement of parts and in the material selected for energy augmentation may be accomplished by a skilled artisan without departing from its spirit, nor is it to be limited in scope except as set forth in the subjoined claims.

What is claimed is:

1. A prepackaged liquid powerplant comprising annular liquid oxidizer and fuel tanks axially aligned, a central header disposed between said tanks having a central opening forming a common wall therebetween, a combustion chamber centrally positioned in said powerplant having peripheral sets of orifices communicating with said tanks, an axially slidable two position valve means having corresponding sets of orifices, said orifices registerable with said combustion chamber orifices in at least one position of said valve means, a first gas generator comprising an outer casing centrally disposed in said powerplant in axial relation with said combustion chamber containing a centrally perforated solid propellant grain, a second gas generator axially aligned with said first gas generator and centrally positioned in said powerplant between said combustion chamber and said first gas generator comprising an outer casing terminating in an orifice containing end plate, a centrally perforated solid propellant grain in said last-mentioned casing, said last-mentioned solid propellant grain selected to have a lower burning temperature than said first gas generator propellant and having dispersed throughout its mass particulated, energy augmenting combustible material, orifice means interposed between said first and second solid propellant grains, igniter means for initiating combustion of said first gas generator solid propellant grain, means defining an annular gas passage between said second gas generator casing and a wall of one of said tanks, said passage terminating in an annular chamber defined by portions of said second gas generator casing, one of said tanks and said valve means, at least one gas passage from said annular chamber to the other of said tanks for supplying gas pressure thereto, and rupturable means in said tank walls responsive to gas pressure generated by said gas generator for admitting gas under pressure to said tanks.

2. The powerplant of claim 1 wherein the particulated matetrial in said second gas generator solid propellant is a metal.

3. The powerplant of claim 2 wherein the metal is selected from the group consisting of aluminum, lithium, beryllium, titanium and magnesium.

4. The powerplant of claim 1 wherein the particulated material in said second gas generator solid propellant is a metalloid.

5. The powerplant of claim 4 wherein the metalloid is selected from the group consisting of boron, silicon and decaborane.

References Cited

UNITED STATES PATENTS

| | | | |
|---|---|---|---|
| 2,926,613 | 3/1960 | Fox | 60—35.6 |
| 2,940,256 | 6/1960 | Conyers et al. | 60—39.48 |
| 3,083,527 | 4/1963 | Fox | 60—35.6 |
| 3,132,475 | 5/1964 | Hopper | 60—35.6 |

CARLTON R. CROYLE, *Primary Examiner.*

MARK NEWMAN, *Examiner.*

D. HART, *Assistant Examiner.*